(12) United States Patent
Shiiba et al.

(10) Patent No.: US 7,550,170 B2
(45) Date of Patent: Jun. 23, 2009

(54) ACIDIC OIL-IN-WATER EMULSION COMPOSITIONS

(75) Inventors: Daisuke Shiiba, Tokyo (JP); Hidekazu Takahashi, Tokyo (JP); Shigeru Kawai, Tokyo (JP); Toshitaka Sakuda, Tokyo (JP); Teruyuki Kimura, Ibaraki (JP)

(73) Assignee: Kao Corporation, Tokyo (JP)

( * ) Notice: Subject to any disclaimer, the term of this patent is extended or adjusted under 35 U.S.C. 154(b) by 557 days.

(21) Appl. No.: 11/229,677

(22) Filed: Sep. 20, 2005

(65) Prior Publication Data

US 2006/0062888 A1    Mar. 23, 2006

(30) Foreign Application Priority Data

Sep. 21, 2004 (JP) ............................. 2004-273813
Sep. 24, 2004 (JP) ............................. 2004-278243
Apr. 28, 2005 (JP) ............................. 2005-131639

(51) Int. Cl.
   *A23D 7/005* (2006.01)
(52) U.S. Cl. ................... 426/605; 426/611; 426/612; 426/613
(58) Field of Classification Search ................ 426/605
   See application file for complete search history.

(56) References Cited

U.S. PATENT DOCUMENTS

| | | | |
|---|---|---|---|
| 2,266,591 A | 12/1941 | Eckey et al. | |
| 4,656,045 A | 4/1987 | Bodor et al. | |
| 4,960,794 A | 10/1990 | Tsubaki et al. | |
| 5,077,069 A | 12/1991 | Chang et al. | |
| 5,160,759 A | 11/1992 | Nomura et al. | |
| 5,260,077 A | 11/1993 | Carrick et al. | |
| 5,733,594 A | 3/1998 | Hirose et al. | |
| 5,773,073 A * | 6/1998 | Matsuda et al. | 800/300 |
| 5,786,019 A | 7/1998 | Cain et al. | |
| 5,879,735 A | 3/1999 | Cain et al. | |
| 5,891,495 A | 4/1999 | Cain et al. | |
| 5,897,906 A | 4/1999 | Suwa et al. | |
| 5,912,042 A | 6/1999 | Cain et al. | |
| 5,972,412 A | 10/1999 | Sassen et al. | |
| 5,998,396 A | 12/1999 | Nakano et al. | |
| 6,004,611 A | 12/1999 | Gotoh et al. | |
| 6,087,353 A | 7/2000 | Stewart et al. | |
| 6,117,475 A | 9/2000 | Van Amerongen et al. | |
| 6,129,924 A | 10/2000 | Maurel et al. | |
| 6,139,897 A * | 10/2000 | Goto et al. | 426/601 |
| 6,143,348 A | 11/2000 | Cain et al. | |
| 6,171,636 B1 | 1/2001 | Sassen et al. | |
| 6,217,874 B1 | 4/2001 | Johannsen | |
| 6,258,808 B1 | 7/2001 | Hauer et al. | |
| 6,277,430 B1 | 8/2001 | Cain et al. | |
| 6,423,363 B1 | 7/2002 | Traska et al. | |
| 6,635,777 B1 | 10/2003 | Kawai et al. | |
| 6,743,459 B2 * | 6/2004 | Shiiba et al. | 426/602 |
| 6,764,707 B1 * | 7/2004 | Masui et al. | 426/601 |
| 7,160,569 B2 * | 1/2007 | Kudou et al. | 426/605 |
| 7,182,971 B2 * | 2/2007 | Takase et al. | 426/601 |
| 7,232,586 B2 * | 6/2007 | Nishide et al. | 426/601 |
| 2002/0119239 A1 | 8/2002 | Shiiba et al. | |
| 2002/0132035 A1 | 9/2002 | Tamarkin et al. | |
| 2002/0142088 A1 | 10/2002 | Fabian et al. | |
| 2003/0021879 A1 | 1/2003 | Bauer-Plank et al. | |
| 2003/0215545 A1 | 11/2003 | Kawai et al. | |
| 2004/0009284 A1 | 1/2004 | Boice et al. | |
| 2004/0037940 A1 * | 2/2004 | Kudou et al. | 426/602 |
| 2004/0111762 A1 | 6/2004 | Anai et al. | |
| 2004/0209953 A1 | 10/2004 | Wai Lee | |
| 2004/0229805 A1 | 11/2004 | Ardies | |

FOREIGN PATENT DOCUMENTS

| | | |
|---|---|---|
| CN | 1420727 A | 5/2003 |
| EP | 1 214 886 A1 | 6/2002 |
| EP | 1 378 178 A1 | 1/2004 |
| EP | 1 407 674 A1 | 4/2004 |
| EP | 1 483 973 A1 | 12/2004 |
| JP | 63-63343 | 3/1988 |
| JP | 3-8431 | 1/1991 |
| JP | 4-300826 | 10/1992 |
| JP | 10-176181 | 6/1998 |
| JP | 10-313820 | 12/1998 |
| JP | 2001-138 | 1/2001 |
| JP | 2002-171931 | 6/2002 |
| JP | 2002-176952 | 6/2002 |
| JP | 2002-206100 | 7/2002 |
| JP | 2002-212587 | 7/2002 |
| JP | 2003-160795 | 6/2003 |
| JP | 2003-226890 | 8/2003 |
| JP | 2004-248518 | 9/2004 |
| WO | WO 99/48378 | 9/1999 |
| WO | WO 03/047359 A1 | 6/2003 |

* cited by examiner

*Primary Examiner*—Carolyn A Paden
(74) *Attorney, Agent, or Firm*—Oblon, Spivak, McClelland, Maier & Neustadt, P.C.

(57) ABSTRACT

An oil-in-water emulsion composition contains the following ingredients (A), (B) and (C):
(A) an oil or fat having a diglyceride content of at least 50 wt %, in which at least 80 wt % of fatty acids constituting diglycerides are unsaturated fatty acids;
(B) a mixture of polyglycerol fatty acid esters having an esterification degree of at least 80%, in which from 50 to 95 wt % of fatty acids constituting the polyglycerol fatty acid esters are $C_{14-22}$ unsaturated fatty acids; and
(C) yolk.

7 Claims, No Drawings

ACIDIC OIL-IN-WATER EMULSION COMPOSITIONS

FIELD OF THE INVENTION

This invention relates to acidic oil-in-water emulsion compositions useful preferably in mayonnaise and dressings.

BACKGROUND OF THE INVENTION

In recent years, diglycerides have been found to have an obesity preventing effect, a weight-gain controlling effect, and the like (PCT International Publication Pamphlet No. WO 99/48378, JP-A-04-300826, JP-A-10-176181), and their addition to various foods is being attempted.

It has been reported that the use of a glyceride mixture, which contains diglycerides at high concentration, as an oil phase can provide an edible oil-in-water emulsion composition having a rich fatty mouthfeel and a good taste and flavor even when the amount of fat is decreased (JP-A-03-008431).

It has also been reported that a stable oil-in-water emulsion composition can be obtained by using lysophospholipids as much as 15% or more (in terms of phosphorus amount) based on the total phospholipids in an acidic oil-in-water emulsion composition (JP-A-2001-000138). When a high-diglyceride oil or fat is used as an oil phase in an acidic oil-in-water emulsion composition, however, demulsification may take place under refrigerated conditions (−5° C. to 5° C.) to develop oil-water separation depending on the kind of fatty acids making up an oil or fat as a raw material. As a cause of such a phenomenon, it was considered that, as diglycerides have higher melting point than triglycerides, some of the diglycerides crystallize under refrigerated conditions. With a view to making an improvement in the low-temperature resistance under refrigerated conditions (−5° C. to 5° C.), an investigation was made into emulsifiers useful as crystallization inhibitors for oil and fat, and led to a report indicating that a particular range of emulsifiers are effective as crystallization inhibitors (JP-A-2002-176952)

As techniques for inhibiting crystallization of oil or fat composed primarily of triglycerides, on the other hand, it was already known to use a mixture of polyglycerol fatty acid esters containing a predominant proportion of saturated fatty acids esters (U.S. Pat. No. 2,266,591, JP-A-10-313820, JP-A-63-063343) or to use a mixture of polyglycerol fatty acid esters containing a large proportion of erucic acid esters (JP-A-2004-248518, JP-A-2002-212587). Plant sterols and plant sterol esters are also known to have tendency to crystallize in oil or fat when they are dissolved in the oil or fat, and therefore, methods have been reported to inhibit their crystallization (JP-A-2003-226890, JP-A-2003-160795) There are also a technique to prepare an acidic oil-in-water emulsion with diglycerides contained at low concentration by using enzyme-treated yolk as a method for stabilizing an acidic oil-in-water emulsion containing a plant sterol (JP-A-2002-171931, JP-A-2002-206100), and also a technique relating to the prevention of demulsification of an oil-in-water emulsion composition under vibrations applied during transportation by adding a plant sterol to the oil-in-water emulsion composition (PCT International Publication Pamphlet No. WO 03/047359), etc.

SUMMARY OF THE INVENTION

This invention provides an oil-in-water emulsion composition containing the following ingredients (A), (B) and (C):

(A) an oil or fat having a diglyceride content of at least 50wt %, in which at least 80wt % of fatty acids constituting diglycerides are unsaturated fatty acids;
(B) a mixture of polyglycerol fatty acid esters having an esterification degree of at least 80%, in which from 50 to 95 wt % of fatty acids constituting the polyglycerol fatty acid esters are $C_{14-22}$ unsaturated fatty acids; and
(C) yolk.

DETAILED DESCRIPTION OF THE INVENTION

Assuming an acidic oil-in-water emulsion composition is materialized as a commercial product such as mayonnaise, this composition is required to have not only low-temperature resistance under refrigerated conditions but also resistance under conditions needed to take into considerations its transportation in a cold temperature area. Described specifically, the possession of low-temperature resistance at −5° C. is not sufficient, leading to a requirement for a still further improvement in low-temperature resistance, for example, resistance at −10° C. or so. In the case of an acidic oil-in-water emulsion composition making use of a high-diglyceride oil or fat composition as an oil phase, however, its low-temperature resistance at −10° C. is somewhat insufficient with the emulsifiers disclosed in the above-cited patent publications as demulsification is occasionally caused, which results in water-oil separation.

After being opened, mayonnaise is preserved in a refrigerator from the viewpoint of rotting prevention. Upon use, its temperature is restored to room temperature, and after use, is again returned to the refrigerator. These temperature changes are repeated over and over. In a cold temperature area, on the other hand, mayonnaise may be exposed to cold air at night, and then warmed by room heating in the daytime. As a result of such temperature changes, its emulsified state could be unstable. Further, an acidic oil-in-water emulsion composition such as mayonnaise filled in a resin-made, ordinary mayonnaise container is subjected to a squeeze pressure every time it is used. As such, the emulsion was often observed to be unstable and demulsified, and consequently run into danger of quality deterioration, such as water separation.

An acidic oil-in-water emulsion composition making use of a high-diglyceride oil or fat composition as an oil phase is, therefore, required to have high stability in physical properties, taste and flavor to a temperature change and squeeze shear, both of which repeatedly occur upon use, in addition to low-temperature resistance.

An object of the present invention is, therefore, to provide an acidic oil-in-water emulsion composition, which contains diglycerides at high concentration, and in addition to low-temperature resistance imparted assuming transportation in a cold temperature area, has high stability to squeeze shear and a temperature change which repeatedly occur upon use.

It was considered that, as diglycerides have higher melting point than triglycerides and are prone to crystallization, some of the diglycerides crystallize under low-temperature conditions to develop demulsification. Using the inhibition of crystallization of diglycerides as a criterion, a variety of crystallization inhibitors have been investigated.

As a result, the present inventors have obtained results which were by no means expected from the conventional findings. Described specifically, it has been found that in an acidic oil-in-water emulsion composition making use of a high-glyceride oil or fat and yolk, the use of a mixture of polyglycerol fatty acid esters having an esterification degree of at least 80%, in which from 50 to 95 wt % of fatty acids that constitute the mixture of polyglycerol fatty acid esters consist of unsaturated fatty acids, can improve the low-temperature resistance at −10° C. set as a condition for transportation emulsions in cold temperature areas and at the same time, can impart squeeze shear resistance and temperature change resistance and can keep the physical properties of the emulsion unchanged despite the promotion of crystallization of the whole oil or fat composition at low temperatures. The above-described finding has led to the completion of the present invention.

It is to be noted that JP-A-2002-212587 gives no disclosure about an emulsion making use of a high-diglyceride oil or fat as an oil phase and its effectiveness, although it discloses the use of a mixture of polyglycerol fatty acid ester, said mixture being composed primarily of erucic acid, as a crystallization inhibitor for oil and fat and contains a description to the effect that oil and fat to which its invention is applicable include diglycerides. As will be described subsequently herein, it has not been confirmed that the crystallization inhibitor of JP-A-2002-212587 has any crystallization inhibiting effect. The effectiveness of a mixture of polyglycerol fatty acid esters in an emulsion which makes use of a high-diglyceride oil or fat as an oil phase cannot be explained by the prior art such as JP-A-2002-212587, and therefore, is considered to be an unexpected effect specific to emulsions making use of a high-diglyceride oil or fat as an oil phase.

According to the present invention, the acidic oil-in-water emulsion composition has the low-temperature resistance at −10° C., which has been set assuming transportation in cold temperature areas, and can maintain pronounced stability to squeeze shear and a temperature change, to both of which the composition is repeatedly subjected upon its use, although the composition uses an oil or fat with diglycerides contained at high concentration.

The diglycerides used in the oil or fat, the ingredient (A) in the present invention, can preferably have low melting points so that, even when store data low temperature as in a refrigerator or the like, neither crystallization nor solidification takes place. Specifically, the carbon numbers of constituent fatty acid residual groups may range preferably from 8 to 24, more preferably from 16 to 22. The amount of unsaturated fatty acid residual groups may be preferably 80 wt % ("wt %" will hereinafter be described simply as "%") or more, more preferably from 80 to 100%, still more preferably from 90 to 100%, even more preferably from 93 to 98%. Diglycerides can be obtained by a desired method such as an ester exchange reaction between a vegetable oil, an animal fat and oil or the like and glycerol or an esterification reaction between a fatty acid composition, which has been derived from the above-described fats and oils, and glycerol. As a reaction process, either a chemical reaction process making use of an alkali catalyst or a biochemical process making use of an enzyme used for decomposing fats and oils such as lipase can be used. The content of the oil or fat as the ingredient (A) in the composition can be preferably from 8 to 80%, more preferably from 15 to 75%, still more preferably from 30 to 75%, even more preferably from 60 to 70% from the viewpoint of the effectiveness as a lipid metabolism improving food or body-fat accumulation inhibiting food and also the taste and flavor as a food.

In the oil or fat as the ingredient (A) in the acidic oil-in-water emulsion composition according to the present invention, the content of the diglycerides is 50% or higher, preferably from 50 to 99.9%, more preferably from 70 to 95% from the viewpoint of the effectiveness as a lipid metabolism improving food or body-fat accumulation inhibiting food and also the industrial productivity of the oil or fat. Triglycerides, monoglycerides, free fatty acids and/or the like can also be incorporated in the oil phase in addition to diglycerides.

In embodiments of the present invention, the content of triglycerides in the oil or fat as the ingredient (A) may be preferably 50% or lower, more preferably from 0.1 to 50%, still more preferably from 3.3% to 29.85% from the viewpoint of emulsifiability, taste and flavor, physiological effects, and the industrial productivity of the oil or fat.

In the embodiments of the present invention, the content of monoglycerides in the oil or fat as the ingredient (A) may be preferably 5% or lower, more preferably from 0 to 2%, still more preferably from 0.1 to 1.5% from the viewpoint of emulsifiability, taste and flavor, and the industrial productivity of the oil or fat. The constituent fatty acids in these monoglycerides can preferably be the same as those of the diglycerides from the viewpoint of the industrial productivity of the oil or fat.

In the embodiments of the present invention, the content of free fatty acids (salts) in the oil or fat as the ingredient (A) may be preferably 1% or lower, more preferably from 0 to 0.5%, still more preferably from 0.05 to 0.2% from the viewpoint of emulsifiability, taste and flavor, and the industrial productivity of the oil or fat.

In the mixture of the polyglycerol fatty acid esters as the ingredient (B) in the acidic oil-in-water emulsion composition according to the present invention, the content of unsaturated fatty acids in the constituent fatty acids is from 50 to 95%, preferably from 55 to 90%, more preferably from 60 to 85%, still more preferably from 65 to 82%, even more preferably from 70 to 80% from the viewpoint of low-temperature resistance, squeeze shear resistance and temperature change resistance.

In the mixture of the polyglycerol fatty acid esters as the ingredient (B), the content of saturated fatty acids in the constituent fatty acids is from 5 to 50%, preferably from 10 to 45%, more preferably from 15 to 40%, still more preferably from 18 to 35%,.even more preferably from 20 to 30% from the viewpoint of low-temperature resistance, squeeze shear resistance and temperature change resistance.

In the mixture of the polyglycerol fatty acid esters as the ingredient (B) in the embodiments of the present invention, the content of erucic acid in the constituent fatty acids may be preferably from 50 to 90%, more preferably from 55 to 90%, still more preferably from 60 to 85%, even more preferably from 65 to 82%, still even more preferably from 70 to 80% from the viewpoint of low-temperature resistance, squeeze shear resistance and temperature change resistance.

In the mixture of the polyglycerol fatty acid esters as the ingredient (B) in the embodiments of the present invention, constituent unsaturated fatty acids other than erucic acid can include oleic acid, linoleic acid, linolenic acid, elaidic acid, and the like, with oleic acid and linoleic acid being preferred. The content of oleic acid may be preferably 39% or lower, more preferably from 0 to 20%.

In themixture of the polyglycerol fatty acid esters as the ingredient (B) in the embodiments of the present invention, the content of stearic acid in the constituent fatty acids may be preferably from 5 to 50%, more preferably from 10 to 40%, still more preferably from 15 to 35%, even more preferably from 20 to 30% from the viewpoint of low-temperature resistance, squeeze shear resistance and temperature change resistance. It is to be noted that the weight ratio of erucic acid to stearic acid may be preferably 2.5 or greater, more preferably from 2.7 to 10, still more preferably from 2.9 to 5 from the viewpoint of low-temperature resistance, squeeze shear resistance and temperature change resistance.

In the embodiments of the present invention, constituent saturated fatty acids other than stearic acid in the mixture of polyglycerol fatty acid esters as the ingredient (B) can include myristic acid, palmitic acid, and the like, with palmitic acid being preferred. The content of palmitic acid may be preferably 20% or lower, more preferably from 0 to 10%.

In the embodiments of the present invention, the mixture of polyglycerol fatty acid esters as the ingredient (B) has an esterification degree of 80% or higher. From the viewpoint of low-temperature resistance, squeeze shear resistance and temperature change resistance, however, the esterification degree may range preferably from 85 to 100%, more preferably from 90 to 100%. The term "esterification degree" as used herein means a value (%) of the number of esterified hydroxyl groups in a molecule of each polyglycerol fatty acid ester as expressed in terms of percentage based on the total number of hydroxyl groups in a molecule of the corresponding polyglycerol.

In the mixture of polyglycerol fatty acid esters as the ingredient (B) in the embodiments of the present invention, the average polymerization degree of the polyglycerols may be preferably from 2 to 12, more preferably from 2 to 10, still more preferably from 2 to 6, even more preferably 4 from the viewpoint of low-temperature resistance, squeeze shear resistance and temperature change resistance. In the present invention, the average polymerization degree of polyglycerols was calculated from the hydroxyl value.

In the acidic oil-in-water emulsion composition according to the present invention, the content of the mixture of polyglycerol fatty acid esters as the ingredient (B) may be preferably from 0.05 to 2%, more preferably from 0.1 to 1.5%, still more preferably from 0.3 to 1.2%, even more preferably from 0.5 to 1% from the viewpoint of the effect to improve the low-temperature resistance and the taste and flavor as a food.

The yolk for use as the ingredient (C) in the present invention can be in any form such as a raw, frozen, powdered, salted or sugared form, or may be added in the form of whole egg including egg white. The content of yolk in the composition may be preferably from 5 to 20%, more preferably from 7 to 17%, still more preferably from 8 to 15%, even more preferably from 10 to 15% in terms of liquid yolk from the viewpoint of improvements in taste and flavor.

In the embodiments of the present invention, the yolk as the ingredient (C) can preferably be one treated with an enzyme from the viewpoint of emulsion stability. As the enzyme for use in the enzymatic treatment of yolk, esterase, lipase and phospholipase are preferred, lipase and phospholipase are more preferred, and phospholipase is still more preferred. In phospholipase, phospholipase A, namely, phospholipase A1 and phospholipase A2 are preferred, with phospholipase A2 being more preferred.

In the yolk as the ingredient (C) in the embodiments of the present invention, the weight percentage of lysophospholipids to the total phospholipids in the yolk (will hereinafter be referred to as "lyso percentage") may be preferably 15% or more, more preferably 25% or more, more preferably from 25 to 75%, still more preferably from 29 to 70%, even more preferably from 45 to 70%, still even more preferably from 50 to 70% from the viewpoint of emulsion stability. Lysophospholipids can preferably be those derived from yolk as mentioned above. As an alternative, however, those derived from soybeans can be used, or those derived from yolk and those derived from soybeans can be used in combination.

As enzyme-treatment conditions for yolk as the ingredient (C) in the embodiments of the present invention, conditions can be chosen as desired such that the lyso percentage becomes 15% or higher when enzyme-treated yolk is used as the entirety of the yolk. Specifically, the amount of an enzyme to be added may be preferably from 0.0001 to 0.1%, more preferably from 0.001 to 0.01 based on yolk when the enzyme activity is 10,000 IU/mL. The reaction temperature may be preferably from 20 to 60° C., more preferably from 30 to 55° C. The reaction time may be preferably from 1 hour to 30 hours, more preferably from 5 hours to 25 hours. When enzyme-treated yolk is used as a part of the yolk, on the other hand, the enzyme-treatment conditions can be chosen such that the total lyso percentage of the enzyme-untreated yolk and enzyme-treated yolk falls within the above-described range. In this case, it is desired from the viewpoint of low-temperature resistance, temperature change resistance and squeeze shear resistance that the content of the enzyme-untreated yolk in the entirety of the yolk ranges preferably from 1 to 85%, more preferably from 10 to 70%, still more preferably from 15 to 50%, even more preferably from 20 to 30%. Such enzyme treatment can be conducted preferably in a stage before the individual raw materials are combined and subjected to emulsification processing.

In the embodiments of the present invention, it is also possible to incorporate a plant sterol (PS) and/or a plant sterol fatty acid ester (PSE), both of which have a blood cholesterol lowering effect. The combined use of diglycerides and a plant sterol makes it possible to further improve the usefulness as a lipid metabolism improving food. The term "plant sterol (PS)" as used herein means a free plant sterol, examples of which include α-sitosterol, β-sitosterol, brasicasterol, stigmasterol, ergosterol, campesterol, α-sitostanol, β-sitostanol, brasicastanol, stigmastanol, ergostanol, campestanol, and cycloartenol. As the plant sterol fatty acid ester (PSE), it is possible to use one obtained by an esterification reaction between the plant sterol and a fatty acid or by an ester interchange reaction between the plant sterol and fats and oils or partial glycerides. As an alternative, a concentrated product of an extract from natural fats and oils are also usable. In the present invention, their esters such as ferulate esters and cinnamate esters, glycosides, and mixtures thereof can be used either singly or in combination.

The fatty acids which constitute the above-described PSE can preferably be fatty acids derived from vegetable oils, such as soybean oil fatty acids, rapeseed oil fatty acids, sunflower oil fatty acids, corn oil fatty acids, a fractionation product, and a mixture thereof. In the composition of fatty acids in PSE, the content of unsaturated fatty acids may be preferably 80% or higher, more preferably from 85 to 100%, still more preferably from 88 to 99%, even more preferably from 90 to 98%. Further, in the constituent fatty acids in PSE, the content of oleic acid may be preferably from 15 to 75%, more preferably from 20 to 70%, still more preferably from 25 to 65%. The content of linoleic acid may be preferably from 10 to 60%, more preferably from 12 to 45%, still more preferably from 15 to 30%. The content of linolenic acid may be preferably from 0 to 15%, more preferably from 1 to 12%, still more preferably from 3 to 9%.

In the embodiments of the present invention, the content of PS and/or PSE in the acidic oil-in-water emulsion composition may be preferably from 1 to 10%, more preferably from 1.2 to 10%, still more preferably from 2 to 5% in terms of free plant sterol on the basis of the oil or fat as the ingredient (A). Further, the weight ratio of PSE to the plant sterol (PS) and plant sterol fatty acid ester (PSE) [PSE/(PS+PSE)] may be preferably greater than 0.3, more preferably from 0.7 to 1, still more preferably from 0.8 to 1, even more preferably from 0.9 to 0.99 from the viewpoint of taste and flavor, temperature change resistance and squeeze shear resistance. In addition, the content of PS may be controlled preferably to from 0.001 to 0.3%, with from 0.01 to 0.2% being more preferred and from 0.05 to 0.15% being still more preferred, based on the oil or fat as the ingredient (A) from the viewpoint of taste and flavor, temperature change resistance and squeeze shear resistance.

In the embodiments of the present invention, it is possible to incorporate, in the aqueous phase of the acidic oil-in-water emulsion composition, one or more of water; edible vinegars such as rice vinegar, sake lees vinegar, apple vinegar, grape vinegar, cereal vinegar, and synthetic vinegar; common salt; seasonings such as sodium glutamate; saccharides such as sugar and starch syrup; taste-imparting substances such as sake and sweet sake; various vitamins; organic acids such as citric acid, and salts thereof; spices: squeezed juices of various vegetables or fruits, such as lemon juice; thickening polysaccharides such as xanthan gum, gellan gum, guar gum, tamarind gum, carageenan, pectin, and tragacanth gum; starches such as potato starch, their decomposition products, and starches obtained by chemically treating them; synthetic emulsifiers such as sugar fatty acid esters, sorbitol fatty acid esters, and polysorbate; natural emulsifiers such as lecithin and enzymolyzates thereof; dairy products such as milk; various fruit juices; proteins such as soybean protein, milk protein, and wheat protein; protein-based emulsifiers such as isolated products or decomposition products of these proteins; and various phosphate salts. In the present invention, they can be added as desired depending on the viscosity, physical properties and the like of the target composition.

The pH of such an aqueous phase is acidic from the viewpoint of taste, flavor and shelf life, and may be preferably from 2 to 6, more preferably from 3 to 5. For a pH adjustment of the aqueous phase, it is possible to use one or more of acidifiers such as the above-described edible vinegars, organic acids, salts of organic acids, and fruit juices.

In the embodiments of the present invention, the mixing ratio (weight ratio) of the oil phase to the aqueous phase in the acidic oil-in-water emulsion composition may be preferably from 10/90 to 80/20, more preferably from 20/80 to 75/25, still more preferably from 35/65 to 72/28, even more preferably from 60/40 to 70/30.

In the embodiments of the present invention, examples of the product form of the acidic oil-in-water emulsion composition include dressings, semi-solid dressings, emulsified liquid dressings, mayonnaise, salad dressings, and French dressings as defined in the Japanese Agricultural Standards (JAS). It is, however, to be noted that the examples are not specifically limited to the above-exemplified products but also widely encompass those called mayonnaise analogues, quasi-mayonnaise food products, dressings, and quasi-dressing food products.

In the embodiments of the present invention, the acidic oil-in-water emulsion composition can be produced, for example, by the below-described method. Firstly, the oil ingredients (A) and (B), that is, the diglyceride-containing oil or fat and the mixture of polyglycerol fatty acid esters are mixed together to prepare an oil phase. An ingredient such as PS/PSE may also be mixed in the oil phase as needed. Further, the yolk (C) and other water-soluble raw materials are mixed together to prepare an aqueous phase. The oil phase is added to the aqueous phase, and subsequent to pre-emulsification as needed, homogenization is performed to obtain an acidic oil-in-water emulsion composition. As a homogenizer, it is possible to use, for example, a high-pressure homogenizer such as "MANTON-GAULIN™" or "MICROFLUID-IZER™", an ultrasonic emulsifier, a colloid mill, an agitating homomixer, a milder homomixer, or the like.

The acidic oil-in-water emulsion composition produced as described above is filled in a container, and can be used as a packaged emulsified food product in a similar manner as conventional mayonnaise and dressings. It can be used, for example, in preparing, making or cooking sauces such as tartar sauce, sandwiches, salads, roasted or broiled dishes, stir-fries, and sauce-dressed dishes.

In the embodiments of the present invention, any container can be used as a container for the acidic oil-in-water emulsion composition insofar as it is generally used for acidic oil-in-water emulsion compositions such as mayonnaise and dressings. Flexible containers which permit easier handling than glass jars, for example, plastic-made tubular containers are preferred. Usable as such plastic-made containers are those formed by blending and blow-molding one or more of thermoplastic resins such as polyethylene, polypropylene, ethylene-vinyl acetate copolymer, ethylene-vinyl alcohol copolymer, and polyethylene terephthalate; or by laminating and blow-molding two or more layers of these thermoplastic resins.

EXAMPLES

The following examples further describe and demonstrate embodiments of the present invention. The examples are given solely for the purpose of illustration and are not to be construed as limitations of the present invention.

[Preparation of Oil or Fat Compositions]

In accordance with each formulation shown in Table 1, the mixture of polyglycerol fatty acid esters and the plant sterol fatty acid ester were added to the high-diglyceride oil or fat, and the resulting mixture was caused to melt under heating at 70° C. Oil or fat compositions A to M were prepared as described above.

TABLE 1

| Oil compo- sitions | Amount of high-diglyc- eride fat[1] (wt %) | Mixtures of polyglycerol fatty acid esters | | | | Amount of plant sterol/plant sterol fatty acid ester[3] (wt %) | Crystallinity at low temps. | |
|---|---|---|---|---|---|---|---|---|
| | | Amount (wt %) | Av. polymeri- zation deg. | Esterifica- tion deg. (%) | Constituent fatty acids | | 5° C. | 0° C. |
| A | 99.20 | 0.8 | 4 | >80 (about 90) | C22:1 75%, C18:0 25% | — | A | C |
| B | 99.50 | 0.5 | 4 | >80 (about 90) | C22:1 75%, C18:0 25%[2] | — | A | C |
| C | 99.20 | 0.8 | 4 | >80 (about 90) | C22:1 50%, C18:0 50% | — | A | C |
| D | 99.20 | 0.8 | 6 | >80 (about 90) | C22:1 50%, C18:0 50% | — | A | C |
| E | 92.45 | 0.8 | 4 | >80 (about 90) | C22:1 75%, C18:0 25%[2] | 6.75 | A | C |

TABLE 1-continued

| Oil compositions | Amount of high-diglyceride fat[1] (wt %) | Mixtures of polyglycerol fatty acid esters | | | Amount of plant sterol/plant sterol fatty acid ester[3] (wt %) | Crystallinity at low temps. | |
|---|---|---|---|---|---|---|---|
| | | Amount (wt %) | Av. polymerization deg. | Esterification deg. (%) Constituent fatty acids | | 5° C. | 0° C. |
| F | 99.20 | 0.8 | 10 | >80 (about 90) C22:1 50%, C18:0 50% | — | A | C |
| G | 99.20 | 0.8 | 4 | >80 (about 90) C22:1 25%, C18:0 75% | — | B | C |
| H | 99.20 | 0.8 | 4 | >80 (about 90) C22:1 100% | — | A | A |
| I | 99.20 | 0.8 | 4 | >80 (about 90) C18:0 100% | — | C | C |
| J | 99.20 | 0.8 | 4 | ≧80 (about 90) C18:1 39.1%, C18:2 7.6% C16:0 50.5%, C18:0 2% | — | A | A |
| K | 99.20 | 0.8 | 10 | <80 (about 50) C18:1 44%, C18:2 1.4% C16:0 53.5%, C18:0 0.9% | — | A | B |
| L | 99.20 | 0.8 | 10 | ≧80 (about 90) C18:1 40.5%, C18:2 1.7% C16:0 52.7%, C16:1 2.3% C14:0 1.4%, C18:0 0.9%[4] | — | A | C |
| M | 100.0 | — | — | — | — | A | B |

[1]Glyceride composition: MG 0.4%, DG 85.5%, TG 14.1%. Fatty acid composition: C16:0 3.0%, C18:0 1.4%, C18:1 38.8%, C18:2 47.3%, C18:3 8.1%, C20:0 0.3%
[2]The same mixture of polyglycerol fatty acid esters as that used in the oil composition A.
[3]"CARDIOAID-S", trade name, product of Archer Daniels Midland Company, U.S.A.
[4]Mixture of polyglycerol fatty acid esters disclosed in JP-A-2002-176952.

Referential Example

[Crystallinity of Oil or Fat Compositions at Low Temperatures]

The prepared oil or fat compositions A to M (80 g, each) were filled in 100-mL clear glass jars, respectively, and were allowed to stand at 5° C. or 0° C. for 24 hours. Their external appearances were visually observed to assess their crystallinity at the low temperature in accordance with the following standards. The results are shown in Table 1.
A: Good; a clear form.
B: Slightly poor; some turbidity is observed (with fine crystals dispersed and suspended).
C: Poor; substantial turbidity and precipitated crystals are observed (non-homogeneous form).

Examples 1-5, Comparative Examples 1-8

[Production of Mayonnaise]

The oil or fat compositions A to M shown in Table 1 were used as oil phases. The aqueous phases shown in Table 2 were prepared by a method known per se in the art. Mayonnaise were prepared by the two-step emulsification processes. First, pre-mixing was carried out by a mixer. While the aqueous phase were stirring, the oil phase was added to the mixer. And then the pre-mixed products were homogenized by a colloid mill (8,000 rpm, 0.08 mm clearance) to produce mayonnaise samples having an average droplet size of from 2.0 to 3.5 μm. The thus-obtained mayonnaise samples were filled in plastic-made tubular containers of 100 g capacity, respectively, to provide samples.

It is to be noted that the enzyme-treated yolks were prepared by a method to be described next.

Liquid yolk (750 g), which contained common salt at 10% concentration, water (150 g) and common salt (15 g) were mixed to afford diluted salted yolk. After the diluted salted yolk was sufficiently subjected to pre-heating at a reaction temperature, phospholipase $A_2$ having an enzyme activity of 10,000 IU/mL was added at 0.004% to the liquid yolk, followed by a reaction at 50° C. for 20 hours to afford an enzyme-treated yolk I. Its lyso percentage was 56%. On the side, phospholipase $A_2$ having an enzyme activity of 10,000 IU/mL was added at 0.02% to another aliquot of the liquid yolk, followed by a reaction at 50° C. for 20 hours to afford another enzyme-treated yolk II. Its lyso percentage was 88%. The enzyme-treated yolks I,II were used as enzyme-treated yolks, while the diluted salted yolk was used as enzyme-untreated yolk. Each lyso percentage was determined by the following method. Firstly, the reaction mixture was repeatedly extracted with a 3:1 mixed solvent of chloroform and methanol to collect lipids in their entirety from the reaction mixture. The thus-collected liquid mixture was subjected to thin-layer chromatography. By two-dimensional thin-layer chromatography making use of a 65:25:49 mixed solvent of chloroform, methanol and water for the first dimension and a 60:20:20 mixed solvent of butanol, acetic acid and water for the second dimension, the lipid mixture was fractionated. The thus-fractionated, various phospholipids were collected, and the amount of phosphorus in the phospholipids was assayed using a commercial assay kit [the permanganate ashing method, "PHOSPHOLIPID TEST WAKO" (trade name, manufactured by Wako Pure Chemical Industries, Ltd.)]. The lyso percentage (%) was determined by (the weight of phosphorus in a lysophospholipid fraction/the weight of phosphorus in the whole phospholipids)×100.

TABLE 2

| | | Composition I Amount (wt %) | Composition II Amount (wt %) |
|---|---|---|---|
| Aqueous phase | Common salt | 0.3 | 0.3 |
| | sugar | 1.0 | 1.0 |
| | Seasoning | 0.4 | 0.4 |
| | Mustard powder | 0.2 | 0.2 |
| | Thickening agent[5] | 0.1 | 0.1 |
| | Enzyme-treated yolk I | 18.0 | — |
| | Enzyme-treated yolk II | — | 13.2 |
| | General yolk | — | 4.8 |
| | vinegar | 6.0 | 6.0 |
| | Water | 4.0 | 4.0 |
| Oil phase (oil compositions A to M) | | 70.0 | |
| Oil phase (oil compositions A, E) | | | 70.0 |

[5]"SM700" (trade name, product of San-Ei Gen F.F.I., Inc.)

[Low-Temperature Resistance]

After each sample was stored at −5° C. for 1 month or at −10° C. for 3 days, the sample was left over at room temperature for about 4 hours, and its external appearance was visually assessed by a panel of six trained assessors in accordance with the following grading standards.

(External Appearance of Tube Mayonnaise)
A: Good; no change.
A⁻: Good, but some changes are observed in external appearance.
B: Slightly poor, and cracks, separation and the like are observed locally.
C: Poor, and substantial cracks, separation and the like are observed.

(External Appearance of Mayonnaise Squeezed Out of Tube)
A: Good; no change.
A⁻: Good, but some changes are observed in external appearance.
B: Slightly poor, and surface roughening, water separation and oil separation are observed locally.
C: Poor, and substantial surface roughening, water separation and oil separation are observed.

[Squeeze Shear Resistance]

After each sample was allowed to stand at 40° C. for 1 week to age the same, the mayonnaise was taken out of the tube to an extent as much as 20 wt. % of the content to bring the tube into a form that the tube had been centrally depressed and air had been extracted. In that state, the tube was allowed to stand at 5° C. for 24 hours. While holding the tube in place at its upper and lower positions, a reciprocating shear-force was applied alternately back and forth 500 times by the back of a finger. With respect to each of the tube mayonnaise and the mayonnaise squeezed out of the tube, its external appearance was visually assessed by a panel of six trained assessors in accordance with the same grading standards as those employed in the assessment of low-temperature resistance.

[Temperature Change Resistance]

After each sample was allowed to stand at 40° C. for 1 week to age the same, the mayonnaise was taken out of the tube to an extent as much as 40 wt. % of the content to bring the tube into a form that the tube had been centrally depressed and air had been extracted. The tube was then stored for 1 month in a temperature-controlled chamber in which the temperature was changed under predetermined conditions at every 12$^{th}$ hour (kept at 25° C. for 2 hours, chilled to 0° C. over 30 minutes, kept at 0° C. for 9 hours, and then heated to 25° C. over 30 minutes) Subsequently, the tube was taken out of the temperature-controlled chamber and then allowed to stand at room temperature for about 4 hours. With respect to each of the tube mayonnaise and the mayonnaise squeezed out of the tube, its external appearance was visually assessed by a panel of six trained assessors in accordance with the same grading standards as those employed in the assessment of low-temperature resistance.

[Assessment of Taste and Flavor]

After each sample was allowed to stand at 20° C. for 1 month to age the same, its taste and flavor was assessed by a panel of six trained assessors in accordance with the following grading standards.
A⁺: Especially good.
A: Good.
B: An unpleasant taste and offensive odor were sensed a little.
C: Poor.

TABLE 3

| | | | Examples | | | | | | | | Comparative Examples | | | | | | |
|---|---|---|---|---|---|---|---|---|---|---|---|---|---|---|---|---|---|
| | | | 1 | 2 | 3 | 4 | 5 | 6 | 7 | 8 | 1 | 2 | 3 | 4 | 5 | 6 | 7 |
| | Compositions | | I | II | I | I | I | I | II | I | I | I | I | I | I | I | I |
| | Oil compositions | | A | A | B | C | D | E | E | F | G | H | I | J | K | L | M |
| Assessments | Low-temperature resistance (−5° C./1 month) | Kept filled in tube | A | A | A | A | A | A | A | A | A | A | A | A | A | A | C |
| | | After squeezed out | A | A | A | A | A | A | A | A | A | A | A | A | A | A | C |
| | Low-temperature resistance (−10° C./3 days) | Kept filled in tube | A | A | A | A | A | A | A | A | A | C | B | C | C | C | C |
| | | After squeezed out | A | A | A | A | A | A | A | A | A | C | C | C | C | C | C |
| | Squeeze shear resistance | Kept filled in tube | A | A | A | A | A | A | A | A | B | A | A | A | A | A | C |
| | | After squeezed out | A | A | A | A | A⁻ | A | A | B | C | A | A | A | A | A | C |
| | Temperature change resistance | Kept filled in tube | A | A | A | A | A | A | A | B | A | A | A | A | A | A | C |
| | | After squeezed out | A | A | A | A⁻ | A⁻ | A | A | B | A | B | B | A | B | A | C |
| | Taste and flavor | After squeezed out | A | A⁺ | A | A | A | A | A⁺ | A | A | A | A | A | A | A | A |

In the oil or fat compositions A to E in which the high-diglyceride fat was used, no crystallization inhibiting effect was observed (Table 1). However, the invention products (Examples 1 to 8) obtained as the acidic oil-in-water emulsion compositions like mayonnaise by using the oil or fat compositions as oil phases showed extremely good low-temperature resistance (Table 3). Example 6 had the same formulation as Example 1 except for the addition of the plant sterol fatty acid ester, and in all the assessments including low-temperature resistance, showed equivalent effects as Example 1

In contrast, Comparative Example 7 did not contain any mixture of polyglycerol fatty acid esters, and did not have any sufficient low-temperature resistance, squeeze shear resistance or temperature change resistance. Comparative Example 2 used the polyglycerol fatty acid ester prepared from erucic acid alone, which showed only a weak low-temperature resistance improving effect for the emulsion although it had a crystallization inhibiting effect for the fat. In Comparative Example 3 in which the mixture of polyglycerol fatty acid esters free of unsaturated fatty acids was used, no low-temperature resistance improving effect was exhibited for both the fat and the emulsion. In Comparative Examples 4, 5 and 6, the mixtures of polyglycerol fatty acid esters were similar in the composition of constituent fatty acids and were low in the content of unsaturated fatty acids, and further, the esterification degree was low in Comparative Example 5.

Comparative Examples 4, 5 and 6, therefore, all showed only a weak low-temperature resistance improving effect for the emulsions.

As to the taste and flavor, the combined use of enzyme-untreated yolk was conspicuous in the egg taste and flavor specific to mayonnaise, and provided particularly good mayonnaise (Examples 2 and 7).

What is claimed is:

1. An oil-in-water emulsion composition comprising the following ingredients (A), (B), (C) and (D):
   (A) an oil or fat having a diglyceride content of at least 50 wt %, in which at least 80 wt % of fatty acids constituting diglycerides are unsaturated fatty acids;
   (B) a mixture of polyglycerol fatty acid esters having an esterification degree of at least 80% in which an average polymerization degree of polyglycerols is from 2 to 6, wherein from 50 to 95 wt % of fatty acids constituting the polyglycerol fatty acid esters are $C_{14-22}$ unsaturated fatty acids; wherein in the fatty acids constituting the polyglycerol fatty acid esters a content of erucic acids is from 50 to 90 wt. %; and a content of the polyglycerol fatty acid esters is from 0.05 to 2 wt. % relative to the ingredient (A);
   (C) from 5 to 20 wt. % of yolk and
   (D) water,
   wherein a weight ratio of an oil phase to an aqueous phase in the water-in-oil emulsion composition is from 10/90 to 80/20.

2. The oil-in-water emulsion composition according to claim 1, wherein at least a part of the yolk is enzyme-treated yolk.

3. The oil-in-water emulsion composition according to claim 2, wherein the enzyme is phospholipase.

4. The oil-in-water emulsion composition according to claim 3, wherein in the yolk treated with phospholipase, the proportion of lysophospholipids to total phospholipids of the yolk is at least 15 wt. % in terms of an amount of phosphorus.

5. The oil-in-water emulsion composition according to claim 1, further comprising at least one of a free plant sterol (PS) and a plant sterol fatty acid ester (PSE) in an amount of from 1 to 10 wt % in terms of PS based on the ingredient (A).

6. The oil-in-water emulsion composition according to claim 5, wherein a weight ratio of the PSE to the PS and the PSE meets PSE/(PS+PSE)>0.3, and at least 80 wt % of fatty acids constituting the PSE are unsaturated fatty acids.

7. The oil-in-water emulsion composition according to claim 5 or 6, wherein the PS is contained in an amount of from 0.001 to 0.3 wt % based on the ingredient (A).

* * * * *